United States Patent [19]

Agrawal et al.

[11] Patent Number: 5,587,236

[45] Date of Patent: Dec. 24, 1996

[54] INTERIOR REAR VIEW MIRROR MOUNTING SYSTEM UTILIZING ONE-PACKAGE STRUCTURAL ADHESIVE

[75] Inventors: Raj K. Agrawal; Niall R. Lynam, both of Holland; James K. Galer, Grandville, all of Mich.

[73] Assignee: Donnelly Corporation, Holland, Mich.

[21] Appl. No.: 438,612

[22] Filed: May 10, 1995

Related U.S. Application Data

[62] Division of Ser. No. 773,236, Oct. 9, 1991, abandoned.

[51] Int. Cl.$^6$ ............................ A47G 1/17; B32B 15/08; B32B 17/10; B32B 27/38

[52] U.S. Cl. ............................ 428/334; 156/99; 156/100; 156/106; 248/205.3; 248/467; 248/476; 248/549; 428/198; 428/415; 428/416; 428/417; 428/418; 428/436; 428/437

[58] Field of Search ............................ 428/417, 418, 428/414, 415, 416, 101, 198, 334, 436, 437; 156/60, 94, 99, 103, 106; 248/205.3, 467, 476, 549

[56] References Cited

U.S. PATENT DOCUMENTS

| | | | |
|---|---|---|---|
| 3,131,251 | 4/1964 | Ryan | 248/467 |
| 3,504,878 | 4/1970 | Dressler | 248/205.3 |
| 4,254,931 | 3/1981 | Aikens et al. | 248/549 |
| 4,593,878 | 6/1986 | Stewart | 248/467 |

OTHER PUBLICATIONS

Shields, *Adhesives Handbook*, 1970, pp. 40–41.
Kinloch, *Structural Adhesives*, 1986, pp. 60–63.
Guttman, *Concise Guide To Structural Adhesives*, 1961, pp. 4–5.

*Primary Examiner*—D. S. Nakarani
*Attorney, Agent, or Firm*—Price, Heneveld, Cooper, DeWitt & Litton

[57] ABSTRACT

The present invention comprises a vehicle accessory mounting button, windshield arrangement and a method for making the same which uses nonelastomeric, thermosetting, structural adhesives, preferably in film form, to adhere the accessory mounting button to the interior surface of a windshield. The adhesives provide outstanding long-term adhesion and good accessory assembly vibration performance even under rigorous climate conditions while simultaneously being compatible with conventional autoclaving processes used in windshield manufacturing. Thermosetting structural adhesives suitable to achieve the objectives of this invention include modified epoxies, which have a cure temperature below 325° F., a modulus of elasticity at 85° C. of at least about 10,000 psi when cured, and are compatible with current windshield manufacturing processes.

42 Claims, 2 Drawing Sheets

STEP 1
PLACE LAMINATING INTERLAYER BETWEEN WINDSHIELD GLASS ELEMENTS.

STEP 2
PLACE ADHESIVE FILM BETWEEN BUTTON AND GLASS. APPLY SLIGHT HEAT AND PRESSURE TO TEMPORARILY AFFIX BUTTON TO GLASS.

STEP 3
PUT ASSEMBLY THROUGH AUTOCLAVE CYCLE TO FULLY CURE THE ADHESIVE.

INTERIOR REAR VIEW MIRROR MOUNTING SYSTEM UTILIZING ONE-PACKAGE STRUCTURAL ADHESIVE

This is a divisional of application Ser. No. 07/773,236 filed Oct. 9, 1991, now abandoned.

BACKGROUND OF THE INVENTION

The present invention relates generally to vehicle accessories affixed to vehicular windshields, and in particular, to an improved method for mounting a rearview mirror assembly to an automotive windshield and the rearview mirror/windshield arrangement produced by that method.

The front glass windshield in cars used in the United States, and in many cars used elsewhere in the world, is an assembly consisting of two glass panels laminated together. Conventionally, the process to form the windshield involves cutting two flat glass panels in the shape desired for the windshield and then bending these two flat glass panels as a matched pair to give them a matched compound curvature. A sheet of plasticized polyvinylbutyral (PVB) polymeric interlayer is then placed between the bent glass panels and the assembly so formed passes into an autoclave where the windshield lamination occurs. Such an autoclave process typically involves a cycle such as:

20 minutes at 180° F.;

20 minutes at 285° F. and 200 psi; and cool to room temperature.

However, temperatures in excess of about 325° F. must be avoided so as to reduce any deterioration of the interlayer material. The practice of this windshield manufacturing process has fostered the development of methods which allow simultaneous attachment of the supports for interior rearview mirrors in cars.

Following the bending of the flat glass panels, a button, usually composed of sintered steel or diecast zinc, is attached by an adhesive onto the concave surface of the first of the glass panels intended to be directed to the interior cabin of the vehicle. Conventionally, a plasticized PVB film, which is an elastomeric, thermoplastic material and which is a similar material to that used as the interlayer for the formation of the windshield, is used as the adhesive means. At this stage of the process, the attachment of the button is temporary. This temporary attachment is typically achieved by attaching under modest pressure and heat so that the button is securely held for the assembly to proceed to the autoclave process. It is during the autoclave process of the windshield, at which time lamination of the PVB interlayer between the first and the second bent glass panels occurs, that the permanent attachment of the button to the windshield occurs.

PVB film has been extensively used as the adhesive means to mount mirror buttons to windshields, primarily because it is compatible with the autoclaving cycle for windshields. This compatibility allows the windshield manufacturer to economically supply a windshield to the car manufacturer with the mirror mounting button preattached in its predetermined position on the windshield. At the car assembly plant, a rearview mirror 1 is attached to the button such as shown in FIG. 1.

While the above process has obvious commercial advantages, the use of a PVB film as the adhesive means does have some disadvantages. The primary disadvantage of using PVB film as the adhesive for the button is that it is an elastomeric, thermoplastic material with relatively poor load bearing properties. This deficiency was generally not a problem when the assembly weights for interior rearview mirrors were traditionally from about 100 grams to about 200 grams. Today, however, assembly weights of 400 grams or more are common for interior mirror assemblies that incorporate reading lamps, electrochromic cells and circuitry, twilight sentinels, and the like. These new, heavier mirrors fall off or otherwise detach, even during normal use, with a frequency that is commercially undesirable when attached to windshields via buttons adhered to the windshield using a polyvinylbutyral film. This tendency to fall off has limited the use of the windshield mounting process and has contributed to an alternative, more expensive, mounting technique where the rearview mirrors are mounted in the header area above the windshield. This fall-off of windshield-mounted mirrors is particularly a problem in hot climates, such as found in Arizona, where temperatures in the 70° C.–110° C. range are commonly reached by windshield mounting button arrangements. At these elevated temperatures, PVB film softens considerably. This softening exacerbates the inability of PVB films to support rearview mirrors of increased weight. Also, the overall vibration performance of the mirror assembly attached to the windshield via a PVB film adhesive degrades at elevated temperatures.

Presently, there are no known methods available for forming an effective long-term bond between a mirror assembly and a windshield that ensure the adhesion of the mirror assembly to the windshield over many years and through extreme climatic conditions, even under heavy load, that ensure good overall vibration performance at elevated temperatures and that are compatible with the commercial manufacturing process for laminated windshields. The current PVB film adhesive/mirror mounting button arrangement has been proven not sufficiently adhesive to the windshield to render it effective for most types of interior mirror assemblies. Further, the current PVB film adhesive/mirror mounting button arrangement has been proven to exhibit inferior mirror assembly vibration performance, particularly at elevated temperatures.

BRIEF SUMMARY OF THE INVENTION

The present invention comprises a vehicle accessory mounting button, windshield arrangement and a method for making the same which uses nonelastomeric, thermosetting, structural adhesives to adhere an accessory mounting button to the interior surface of a windshield. It has been surprisingly found that nonelastomeric, thermosetting, structural adhesives provide outstanding long-term adhesion and good accessory assembly vibration performance even under rigorous climate conditions while simultaneously being compatible with conventional autoclaving processes used in windshield manufacturing.

DESCRIPTION OF THE PREFERRED EMBODIMENT

Figures 1, 2:
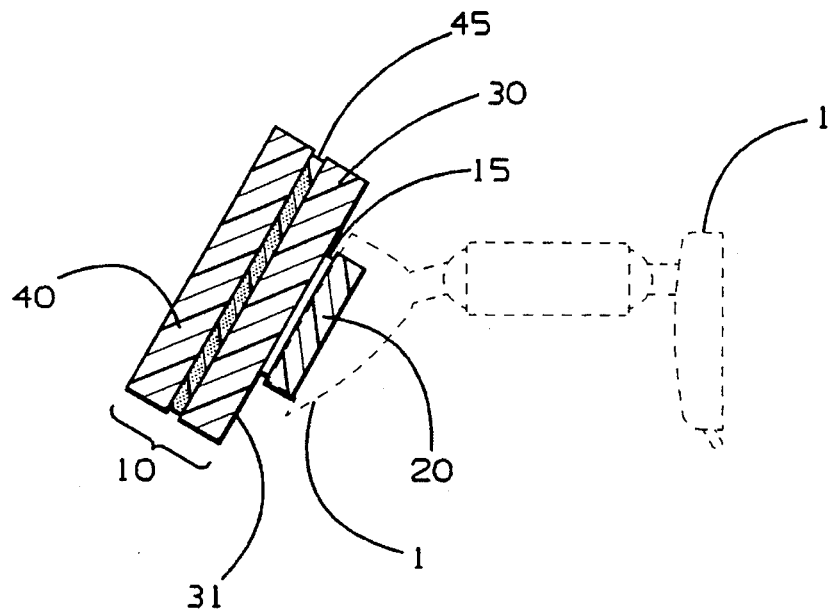
FIG. 1 is a cross section of a rearview mirror/ vehicle accessory button assembly attached to a windshield.
FIG. 2 is a flow diagram of the process for attaching a button to a windshield.

Thermosetting structural adhesives suitable to achieve the objectives of this invention include one-package epoxies, preferably in film form, which have a cure temperature below 325° F., a modulus of elasticity at 85° C. of at least about 10,000 psi when cured, and are compatible with current windshield manufacturing processes. The nonelastomeric, thermosetting structural adhesives used in the present invention have high bond strength in the −67° F. to 250° F. range, high fracture toughness and peel strengths, are resistant to high moisture environments before and after curing, have short cure times, and are free of volatile by-products during cure.

It is preferred that the thermosetting structural adhesives used in the present invention be an adhesive film with common release linings such as paper, wax or plastic and be provided in a film form without the need for a woven or nonwoven supporting carrier. It is also preferred that the adhesive be provided in a one-package form that avoids mixing of reactive components just prior to the attachment of the button at the point of assembly of the windshield. In addition, because the adhesive is consumer visible by direct view from the front of the vehicle, it is preferred that the thermosetting structural adhesive film in its cured state be either a consumer acceptable color such as black, gray, or color matched to the mounting button it adheres to the windshield, or be clear and transparent so that the outside view sees the natural color of the mounting button.

The preferred structural adhesives of the present invention are produced by modification of epoxies, whereby a one-package, latent curing adhesive system is formed capable of substantial cure at temperatures below 325° F. but requiring exposure to temperatures in excess of 125° F., or thereabouts, before substantial curing is achieved. Thus, such a modified epoxy has sufficient stability to be handled and processed at room temperature, and so is compatible with existing windshield manufacturing practices, but achieves a substantial cure within the autoclave cycle used in the windshield manufacturing process. Such modified epoxies are a blend of a polymeric epoxy reaction product (preferably of molecular weight greater than 500 or thereabouts), an epoxy resin such as diglycidyl ether of Bisphenol-A, latent hardeners such as dicyanodiamides, hindered amines, and latent accelerators such as imidazoles and substituted ureas. The polymeric epoxy reaction product provides the physical form in the uncured state. The latent hardeners are curing agents that are activated on heating. Likewise, the action of the latent accelerators is activated by heating. Fillers, colorants, UV stabilizers, viscosity modifiers, as commonly known, can be added to achieve the final film form.

The most preferred adhesive of the present invention is a nonelastomeric thermosetting modified epoxy structural adhesive available from the 3M Company, St. Paul, Minn. under the trade name SCOTCH-WELD™ AF-163-2. SCOTCH-WELD™ AF-163-2 is a blend of a polymeric epoxy reaction product of molecular weight greater than 700, epoxy resins, a dicyanodiamide, a non-volatile amide and n,n'-(methyl-1,3-phenylene)bis(n',n'-dimethylurea).

It has been further found that a specific liquid imidazole, 2-ethyl-4-methyl-imidazole, available from Pacific Anchor Chemical Corporation of Los Angeles, Calif. under the trade name IMICURE™ EMI-24, when applied to, or compounded with, or otherwise contacted with the SCOTCH-WELD™ AF-163-2 adhesive, accelerates the curing rate of the adhesive and further lowers its curing temperature.

Similar acceleration of the curing rate and lowering of the curing temperature of SCOTCH-WELD™ AF-163-2 can be achieved by spraying, wiping or otherwise applying the EMI-24 material to the windshield glass surface and/or to the button metal surface.

Similar acceleration of the curing rate, lowering of the curing temperature and overall further improved performance can be achieved by compounding with, or applying to, or otherwise contacting with the SCOTCH-WELD™ AF-163-2 material either of 1-phenyl-3,3-dimethyl urea or tolyl bis(dimethyl urea) which are available in powder form from Pacific Anchor Chemical Corporation of Los Angeles, Calif. under the trade name AMICURE UR™ and AMICURE UR2T™, respectively SCOTCH-WELD™ AF-163-2 has previously been used in aerospace applications and is available in a variety of colors and film thicknesses with and without a supporting carrier. The material achieves the cure, the degree of adhesion, the resistance to moisture environments, and the overall physical/environmental performance required for mounting button adhesion at a cure temperature below 325° F. which renders it compatible with the conventional windshield autoclaving process.

It is important to stress that the cure of the SCOTCH-WELD™ AF-163-2 structural adhesive occurs simultaneous with, and in the same process step as, the windshield autoclave lamination step. Thus, it is important that the cure temperature be less than 325° F. This obviates the need to preattach mounting buttons with high temperature cure adhesives (such as structural adhesive film AF-42 from 3M Company, St. Paul, Minn.) to bent glass prior to the lamination process in a separate operation involving processing temperatures in excess of that tolerated by the laminating interlayers in common use.

In the preferred embodiment, the vehicle accessory mounted to the windshield is a rearview mirror. It is contemplated, however, that other vehicle accessories such as compasses, radar detectors, microphones for cellular telephones and other accessories can be mounted onto the windshield of a vehicle using the adhesives and techniques disclosed herein.

In the preferred embodiment, FIG. 1 illustrates the attachment of a mounting button 20 to a windshield 10 as well as the phantom attachment of a mirror 1 to button 20. FIG. 2 illustrates a flow diagram regarding the process followed to achieve the attachment of button 20 to windshield 10. In step 1, a layer 45 of plasticized polyvinylbutyral (PVB) sheeting such as BUTACITE™ 140 NC-10 from E. I. du Pont De Nemours of Wilmington, Del. is placed between first glass element 30 and second glass element 40 with, optionally, slight heat and pressure being used to secure these for processing in the next step. In step 2, a film layer 15 of SCOTCH-WELD™ AF-163-2 is positioned between button 20 and surface 31 of first glass element 30. Slight heat (40° C.–50° C.) and small pressure (10–20 psi) can optionally be applied to secure button 20 to glass element 30 while the mounting button/windshield arrangement is being further processed. In step 3, the entire assembly is placed in an autoclave where a conventional autoclave cycle such as described in the background of the invention is used both to achieve the lamination of elements 30 and 40 together to form a safety glazing and to cure adhesive film 15 so that button 20 is securely attached to the glazing assembly.

Figure 3A:
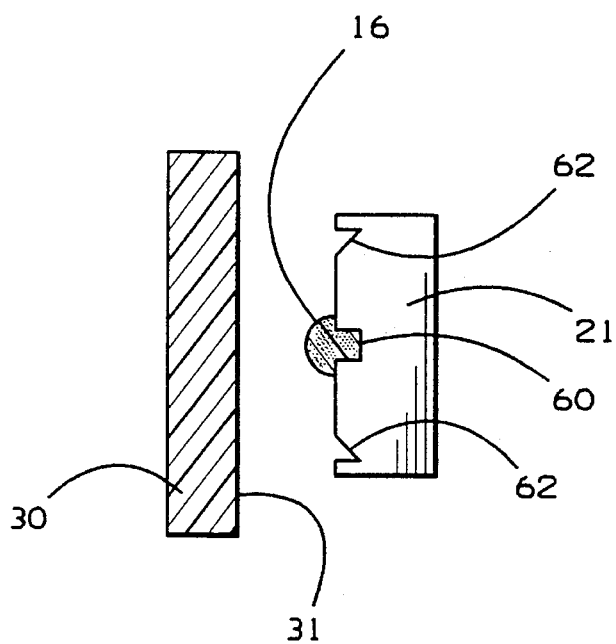
FIGS. 3a and 3b illustrate an alternative design for a vehicle accessory mounting button.
Figure 3B:
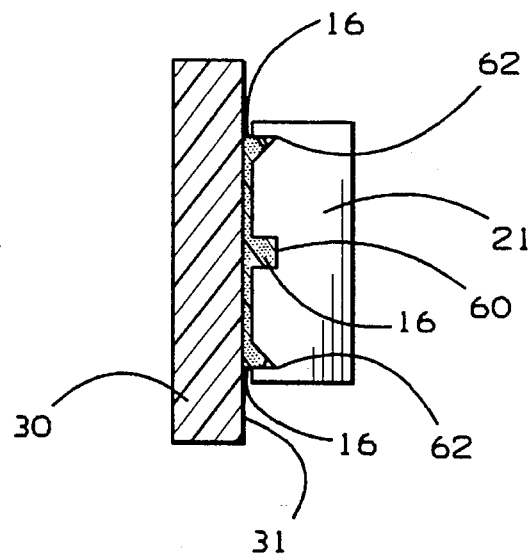
Figure 4A:
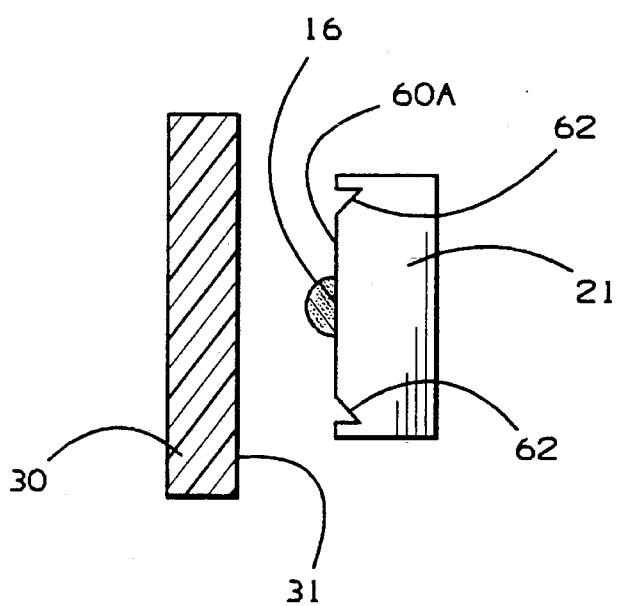
FIGS. 4a and 4b illustrate an alternative design for a vehicle accessory mounting button.
Figure 4B:
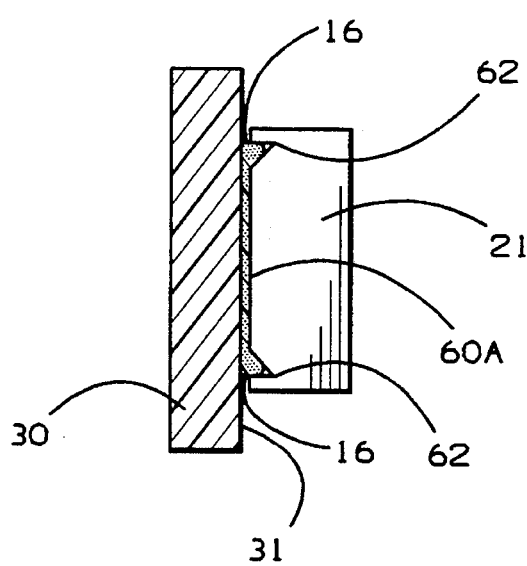

The structural adhesives of this invention can be provided with or without a support carrier (typically a nylon web or equivalent). If supplied in a non-film form, a button 21 such as shown in FIGS. 3A and B can be used to prevent overspill of viscous adhesive 16 around the button periphery when bonded to first glass element 30 of windshield 10. Specifically, as shown in FIG. 3A, a metered amount of viscous adhesive 16 is applied to a receptacle 60 which has been drilled, machined, molded, diecast or otherwise created in the center of a tablet-shaped button 21. When bonded to first glass element 30 as in FIG. 3B, a perimetal groove 62, which is circular or otherwise circumscribing the border of the button 21 and which is slightly inward of the outermost edge of button 21, serves to capture excess adhesive 16 that otherwise could ooze out beyond the button and thus be cosmetically unsightly. In an alternative embodiment, receptacle 60 and/or groove 62 could be undercut to enhance adhesion of button 21 to first glass element 30. It is postulated that these undercuts would serve as anchors which prevent detachment of button 21 from the adhesive 16. In a further preferred embodiment shown in FIGS. 4A and B, button 21 has a smooth face 60A, which may be planar or convex depending upon the curvature of the windshield, and a perimeter groove 62. Groove 62 is preferably circular, is located around the perimeter of button 21 and serves to capture excess adhesive 16 that otherwise could ooze out beyond the button and thus be cosmetically unsightly.

A grooved button, such as shown in FIG. 3, can also be of advantage even when the structural adhesive is provided in film form. When heated under pressure, the adhesive may flow or otherwise squeeze out beyond the button boundary. In this regard, it is often useful to diecut the adhesive to a shape and area smaller than the shape and area of the button being affixed. Also, use of a button whose windshield contacting surface has a convex shape to match the concave curvature of the windshield is optionally desirable.

To illustrate the benefits of the invention, mounting buttons were attached in an autoclave to glass sections using the preferred thermosetting structural adhesive of this invention, an unsupported film of SCOTCH-WELD™ AF-163-2, as layer 15. Film thickness was about 0.005 inches. The performance of these assemblies was compared to buttons similarly attached in an autoclave to glass sections using a thermoplastic plasticized PVB film supplied by Monsanto Company of St. Louis, Mo. under the trade name SAFLEX™ WB-21 for layer 15. The thickness of the PVB film used was about 0.015 inches.

Adhesion of the button was measured using a sinusoidal loading (150 pounds at 10 Hertz) tension/ compression mode test. Testing was performed at −40° C., 25° C. and 85° C. Also, various preconditionings were performed with a 600 gram deadweight attached to button 20. All this was done to evaluate the temperature performance of the thermoplastic adhesive versus the thermosetting adhesive under conditions that simulate and accelerate what can happen during long-term actual driving under climatic extremes.

EXAMPLES

Sample Conditioning

A. No pre-conditioning: Minimum of 24 hours after bonding.

Sinusoidal Loading in tension/compression mode (±150 pounds at 10 Hertz)

All results are in number of cycles to failure

|     | −40° C. | 25° C. | 85° C. |
|-----|---------|--------|--------|
| PVB | 419     | 522    | 197    |
|     | 217     | 211    | 31     |
|     | 221@    | 650    | 36     |

|          | −40° C. | 25° C. | 85° C. |
|----------|---------|--------|--------|
| AF-163-2 | 25000*  | 25000* | 316    |
|          | 25000*  | 25000* | 284    |
|          | 25000*  | 25000* | 287    |

@Sample Shattered
*No Failure

B. Fluid Immersion: 50 hours of 80° C. water immersion with 600 gram deadweight.

|          | After Conditioning | | |
|----------|---------|----------|-----------|
|          | @ Passed | @ Failed | % Failure |
| PVB      | 8       | 10@      | 56        |
| AF-163-2 | 18      | 0        | 0         |

@Button detached from glass

Sinusoidal Loading in tension/compression mode (±150 pounds at 10 Hertz)

All results are in number of cycles to failure

|          | −40° C. | 25° C. | 85° C. |
|----------|---------|--------|--------|
| PVB      | 1       | 124    | 0      |
| AF-163-2 | 25001*  | 25000* | 19469  |
|          | 25000*  | 25000* | 11811  |
|          | 25000*  | 25000* | 16064  |

*No Failure

C. Heat Aging: 360 hours at 95° C. under 600 gram deadweight.

|          | After Conditioning | | |
|----------|----------|----------|-----------|
|          | # Passed | # Failed | % Failure |
| PVB      | 18       | 0        | 0         |
| AF-163-2 | 18       | 0        | 0         |

Sinusoidal Loading in tension/compression mode (±150 pounds at 10 Hertz)

All results are in number of cycles to failure

|          | −40° C. | 25° C. | 85° C. |
|----------|---------|--------|--------|
| PVB      | 25000*  | 1266   | 336    |
|          | 20513   | 1221   | 266    |
|          | 25000*  | 333    | 134    |
| AF-163-2 | 25000*  | 25000* | 25000* |
|          | 25000*  | 25008* | 25000* |
|          | 25000*  | 25002* | 25000* |

*No Failure

D. Cold Environment: 360 hours at −40° C. under 600 gram deadweight.

|          | After Conditioning | | |
|----------|----------|----------|-----------|
|          | # Passed | # Failed | % Failure |
| PVB      | 9        | 0        | 0         |
| AF-163-2 | 9        | 0        | 0         |

Sinusoidal Loading in tension/compression mode (±150 pounds at 10 Hertz)

All results are in number of cycles to failure

|        | −40° C. | 25° C. | 85° C. |
|--------|---------|--------|--------|
| PVB    |         | 869    | 96     |
|        |         | 961    | 25     |
|        |         | 282    | 31     |
| AF-163-2 |       | 25000* | 2210   |
|        |         | 25000* | 1816   |
|        |         | 25000* | 662    |

*No Failure

E. Condensing Humidity: 360 hours of 98 to 100% relative humidity at 37° C. under 600 g deadweight.

| | After Conditioning | | |
|--------|----------|----------|-----------|
|        | # Passed | # Failed | % Failure |
| PVB    | 9        | 0        | 0         |
| AF-163-2 | 9      | 0        | 0         |

Sinusoidal Loading in tension/compression mode (±150 pounds at 10 Hertz)

All results are in number of cycles to failure

|          | −40° C. | 25° C. | 85° C. |
|----------|---------|--------|--------|
| PVB      | 1@      | 42     | 2      |
|          | 12@     | 2      | 7      |
|          | 2       | 789    | 40     |
| AF-163-2 | 25000*  | 25000* | 1259   |
|          | 25002*  | 25008* | 4596   |
|          | 25000*  | 25002* | 4628   |

@Sample Shattered
*No Failure

As shown in the experimental data given above, the thermosetting structural adhesive significantly outperformed the conventional thermoplastic button adhesive in all tests. In several tests with the thermoset material, the failure occurred in the glass itself. With respect to Example A, the modified epoxy grossly outperformed the PVB film at −40° C. and 25° C. and was numerically superior at 85° C. Similar outstanding results were achieved for the modified epoxy adhesive under the fluid immersion test of Example B. Glazing assemblies using the AF-163-2 material also outperformed the thermoplastic PVB film at each temperature range studied with respect to the heat aging, cold environment, thermal cycling and condensing humidity tests, Examples C, D, E and F, respectively.

In addition to the improved bonding performance which results from use of structural adhesives such as AF-163-2, these adhesives are nonelastomeric and, as such, have a modulus of elasticity, when cured, greater than about 30,000 psi at 25° C. and greater than about 10,000 psi at 85° C. Thus, they exhibit superior vibration performance when compared to elastomeric materials such as plasticized PVB and silicones such as Dow Corning® X4-4647 silicone elastomer and Dow Corning® X4-4643 silicone elastomer available from Dow Corning Corporation of Midland, Mich. Plasticized PVB has a modulus of elasticity of about 1000–1500 psi at 25° C. and 260 psi at 85° C. whereas silicones, which are elastomeric materials also conventionally used as a mirror mounting adhesive, typically have a modulus of elasticity of below 500 psi at 85° C.

It is to be understood that while certain specific forms and examples of the present invention are illustrated and described herein, the invention is not to be limited to the specific examples noted hereinabove. Further, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A mirror mounting button, windshield arrangement, comprising:
   a windshield, said windshield including an interior surface;
   a cured non-elastomeric, thermosetting, one-package, structural adhesive in contact with and adhered to said interior windshield surface, said adhesive having a modulus of elasticity at 85° C. of at least about 10,000 psi, said structural adhesive being a latent curing adhesive system capable of substantial cure at a temperature below about 325° F. and requiring exposure to a temperature in excess of about 125° F. before substantial curing is achieved; and
   a mirror mounting button attached to said adhesive, whereby said cured adhesive forms a bond between said windshield and said mirror mounting button, wherein said adhesive bond can support a weight greater than or equal to about 100 grams.

2. The arrangement as set forth in claim 1 wherein said adhesive is a modified epoxy.

3. The arrangement as set forth in claim 2 wherein said adhesive is a blend of a polymeric epoxy reaction product of molecular weight greater than 700, epoxy resins, a dicyanodiamide, a non-volatile amide and n,n'-(methyl-1,3-phenylene) bis (n,n'-dimethylurea).

4. The arrangement as set forth in claim 3 wherein said adhesive is contacted with a latent accelerator selected from the group including tolyl bis(dimethyl urea), 2-ethyl-4-methyl-imidazole and 1-phenyl-3,3-dimethyl urea.

5. The arrangement as set forth in claim 1 wherein said mirror mounting button contains a perimetal groove located at the outer perimeter of said button, whereby excess adhesive applied to said button is contained within said groove during bonding of said button to said glass surface.

6. The arrangement as set forth in claim 5 wherein said adhesive is applied to a receptacle centrally located in said mirror mounting button.

7. The arrangement as set forth in claim 6 wherein said adhesive is a modified epoxy.

8. The arrangement as set forth in claim 7 wherein said adhesive is a blend of a polymeric epoxy reaction product of molecular weight greater than 700, epoxy resins, a dicyanodiamide, a non-volatile amide and n,n'-(methyl-1,3-phenylene) bis (n,n'-dimethylurea).

9. The arrangement as set forth in claim 8 wherein said adhesive is contacted with a latent accelerator selected from the group including tolyl bis(dimethyl urea), 2-ethyl-4-methyl-imidazole and 1-phenyl-3,3-dimethyl urea.

10. The arrangement as set forth in claim 1 further comprising an interior rearview mirror assembly attached to said mirror mounting button.

11. The arrangement as set forth in claim 10 wherein said adhesive bond can support a weight greater than or equal to about 200 grams.

12. The arrangement as set forth in claim 11 wherein said adhesive is a modified epoxy.

13. The arrangement as set forth in claim 12 wherein said adhesive is a blend of a polymeric epoxy reaction product of molecular weight greater than 700, epoxy resins, a dicyanodiamide, a non-volatile amide and n,n'-(methyl-1,3-phenylene) bis (n,n'-dimethylurea).

14. The arrangement as set forth in claim 13 wherein said adhesive is contacted with a latent accelerator selected from the group including tolyl bis(dimethyl urea), 2-ethyl-4-methyl-imidazole and 1-phenyl-3,3-dimethyl urea.

15. The arrangement as set forth in claim 10 wherein said mirror mounting button contains a perimetal groove located at the outer perimeter of said button, whereby excess adhesive applied to said button is contained within said groove during bonding of said button to said glass surface.

16. The arrangement as set forth in claim 15 wherein said adhesive is applied to a receptacle centrally located in said mirror mounting button.

17. The arrangement as set forth in claim 16 wherein said adhesive is a modified epoxy.

18. The arrangement as set forth in claim 17 wherein said adhesive is a blend of a polymeric epoxy reaction product of molecular weight greater than 700, epoxy resins, a dicyanodiamide, a non-volatile amide and n,n'-(methyl-1,3-phenylene) bis (n,n'-dimethylurea).

19. The arrangement as set forth in claim 18 wherein said adhesive is contacted with a latent accelerator selected from the group including tolyl bis(dimethyl urea), 2-ethyl-4-methyl-imidazole and 1-phenyl-3,3-dimethyl urea.

20. An interior rearview mirror mounting system for use on an automobile comprising:

a laminated windshield;

said windshield comprising a first bent glass panel having a front surface and a rear surface, and a second bent glass panel having a front surface and a rear surface;

a sheet of polymeric interlayer disposed between the rear surface of said first panel and the front surface of said second panel wherein said polymeric interlayer laminates said first and second panel together, said lamination together of said first panel and said second panel being achieved by an autoclave process;

a mirror mounting button adhered to said rear surface of said second panel by a layer of substantially cured adhesive and an interior rearview mirror assembly supported by said button;

said layer of substantially cured adhesive being formed by disposing a film of a one-package, structural adhesive between said rear surface of said second panel and said mirror mounting button, and curing said film in an autoclave process to form a joint between said button and said windshield, said curing of said film and said lamination of said windshield being achieved in the same autoclave process; and said film of structural adhesive comprising an epoxy resin and a latent hardener.

21. The mirror mounting system of claim 20 wherein said polymeric interlayer is plasticized polyvinylbutyral.

22. The mirror mounting system of claim 21 wherein said curing of said film occurs at a temperature greater than about 125° F. and less than about 325° F.

23. The mirror mounting system of claim 21 wherein said mirror mounting button comprises one of a sintered steel mounting button or a die cast zinc mounting button.

24. The mirror mounting system of claim 23 wherein said latent hardener comprises a dicyanodiamide or a hindered amine.

25. The mirror mounting system of claim 23 wherein said adhesive film has a thickness of about 0.005 inches.

26. The mirror mounting system of claim 20 wherein said adhesive film is one of a clear adhesive film or a transparent adhesive film.

27. The mirror mounting system of claim 20 wherein said adhesive film is one of a gray adhesive film or a black adhesive film.

28. The mirror mounting system of claim 20 wherein said adhesive film is die cut to the shape of said mounting button.

29. The mirror mounting system of claim 20 wherein said adhesive film is die cut to an area smaller than the area of said mounting button.

30. The mirror mounting system of claim 20 wherein said adhesive film is die cut to a shape and to an area smaller than the shape and area of said mounting button.

31. The mirror mounting system of claim 20 wherein said mirror mounting button comprises a sintered steel mounting button.

32. The mirror mounting system of claim 31 wherein said latent hardener comprises a diocyanodiamide.

33. The mirror mounting system of claim 20 wherein said interior rearview mirror assembly has a weight exceeding about 200 grams.

34. The mirror mounting system of claim 33 wherein said interior rearview mirror assembly has a weight exceeding about 400 grams.

35. An interior rearview mirror mounting system for use on an automobile comprising:

a laminated windshield;

said windshield comprising a first bent glass panel having a front surface and a rear surface, and a second bent glass panel having a front surface and a rear surface;

a sheet of polymeric interlayer disposed between the rear surface of said first panel and the front surface of said second panel wherein said polymeric interlayer laminates said first and second panel together, said lamination together of said first panel and said second panel being achieved by an autoclave process;

a mirror mounting button adhered to said rear surface of said second panel by a layer of substantially cured adhesive;

said layer of substantially cured adhesive being formed by disposing a film of a one-package, structural adhesive between said rear surface of said second panel and said mirror mounting button, and curing said film in an autoclave process to form a joint between said button and said windshield suitable to support an interior rearview mirror assembly, said curing of said film and said lamination of said windshield being achieved in the same autoclave process;

said film of structural adhesive comprising an epoxy resin and a latent hardener; and wherein said curing of said film occurs at a temperature greater than about 125° F. and less than about 325° F.

36. The mirror mounting system of claim 35 wherein said latent hardener comprises one of a dicyanodiamide and a hindered amine.

37. The mirror mounting system of claim 35 wherein said adhesive film has a thickness of about 0.005 inches.

38. The mirror mounting system of claim 35 wherein said latent hardener comprises one of dicyanodiamide or a hindered amine.

39. The mirror mounting system of claim 35 wherein said adhesive film is one of a gray adhesive film or a black adhesive film.

40. The mirror mounting system of claim 35 wherein said mirror mounting button comprises one of a sintered steel mounting button or a die cast zinc mounting button.

41. The mirror mounting system of claim 40 wherein said mirror mounting button comprises a sintered steel mounting button.

42. The mirror mounting system of claim 40 wherein said adhesive film is die cut to a shape and to an area smaller than the shape and area of said mounting button.

* * * * *

(12) EX PARTE REEXAMINATION CERTIFICATE (8101st)

United States Patent
Agrawal et al.

(10) Number: US 5,587,236 C1
(45) Certificate Issued: Mar. 22, 2011

(54) INTERIOR REAR VIEW MIRROR MOUNTING SYSTEM UTILIZING ONE-PACKAGE STRUCTURAL ADHESIVE

(75) Inventors: Raj K. Agrawal, Holland, MI (US);
Niall R. Lynam, Holland, MI (US);
James K. Galer, Grandville, MI (US)

(73) Assignee: Donnelly Corporation, Holland, MI (US)

Reexamination Request:
No. 90/008,676, May 21, 2007

Reexamination Certificate for:
Patent No.: 5,587,236
Issued: Dec. 24, 1996
Appl. No.: 08/438,612
Filed: May 10, 1995

Related U.S. Application Data

(62) Division of application No. 07/773,236, filed on Oct. 9, 1991, now abandoned.

(51) Int. Cl.
*A47G 1/17* (2006.01)
*B32B 15/08* (2006.01)
*B32B 17/10* (2006.01)
*B32B 27/38* (2006.01)

(52) U.S. Cl. .................. 428/334; 156/99; 156/100; 156/106; 248/205.3; 248/467; 248/476; 248/549; 428/198; 428/415; 428/416; 428/417; 428/418; 428/436; 428/437

(58) Field of Classification Search .................. None
See application file for complete search history.

(56) References Cited

U.S. PATENT DOCUMENTS

| 3,131,251 A | | 4/1964 | Ryan |
| 3,499,744 A | | 3/1970 | Tolliver |
| 3,504,878 A | | 4/1970 | Dressler |
| 4,254,931 A | * | 3/1981 | Aikens et al. ............... 248/549 |
| 4,364,595 A | | 12/1982 | Morgan et al. |
| 4,593,878 A | | 6/1986 | Stewart |
| 4,931,125 A | | 6/1990 | Volkmann et al. |
| 5,160,780 A | | 11/1992 | Ono et al. |

OTHER PUBLICATIONS

Shields, *Adhesives Handbook*, "Adhesive Materials and Properties", pp. 40–41 (1970).
Guttmann, *Concise Guide to Structural Adhesives*, pp. 4–5 (1961).
Kinloch, *Structural Adhesives: Developments in Resins and Primers*, pp. 60–63 (1986).

\* cited by examiner

*Primary Examiner*—Jerry D. Johnson

(57) ABSTRACT

The present invention comprises a vehicle accessory mounting button, windshield arrangement and a method for making the same which uses nonelastomeric, thermosetting, structural adhesives, preferably in film form, to adhere the accessory mounting button to the interior surface of a windshield. The adhesives provide outstanding long-term adhesion and good accessory assembly vibration performance even under rigorous climate conditions while simultaneously being compatible with conventional autoclaving processes used in windshield manufacturing. Thermosetting structural adhesives suitable to achieve the objectives of this invention include modified epoxies, which have a cure temperature below 325° F., a modulus of elasticity at 85° C. of at least about 10,000 psi when cured, and are compatible with current windshield manufacturing processes.

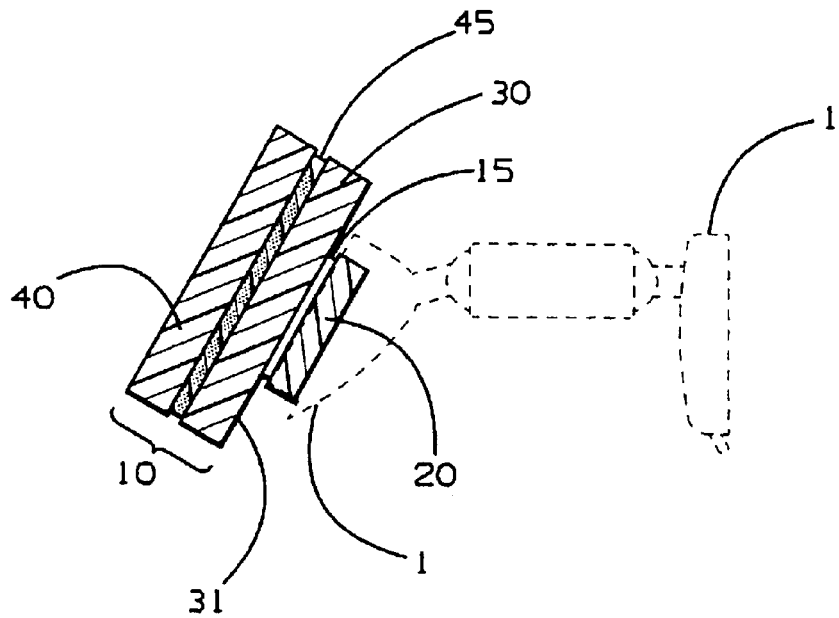

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-42 is confirmed.

New claims 43-48 are added and determiend to be patentable.

43. *An interior rearview mirror mounting system for use on an automobile comprising:*

*a laminated windshield;*

*said windshield comprising a first bent glass panel having a front surface and a rear surface, and a second bent glass panel having a front surface and a rear surface;*

*a sheet of polymeric interlayer disposed between the rear surface of said first panel and the front surface of said second panel wherein said polymeric interlayer laminates said first and second panel together, said lamination together of said first panel and said second panel being achieved by an autoclave process;*

*a mirror mounting button adhered to said rear surface of said second panel by a layer of substantially cured adhesive and an interior rearview mirror assembly supported by said button;*

*said layer of substantially cured adhesive being formed by disposing a film of a one-package, structural adhesive between said rear surface of said second panel and said mirror mounting button, and curing said film in an autoclave process to form a joint between said button and said windshield, said curing of said film and said lamination of said windshield being achieved in the same autoclave process;*

*said film of structural adhesive comprising an epoxy resin and a dicyanodiamide latent hardener; and*

*wherein said film is die cut to a shape of said mirror mounting button and wherein said adhesive in its cured state is one of gray or black.*

44. *The interior rearview mirror mounting system of claim 43, wherein said cured adhesive has a modulus of elasticity greater than about 30,000 psi at 25 degrees C and wherein said adhesive film comprises a polymeric epoxy reaction product.*

45. *The interior rearview mirror mounting system of claim 44, wherein said joint of said mirror button withstands at least 25,000 cycles of sinusoidal loading in tension/compression modes of +/−150 pounds at 10 Hz with the testing performed at 25° C. and after preconditioning said joint for 360 hours in 98 to 100 percent relative humidity at 37° C. and with a 600 gram deadweight attached to said mirror button.*

46. *An interior rearview mirror mounting system for use on an automobile comprising:*

*a laminated windshield;*

*said windshield comprising a first bent glass panel having a front surface and a rear surface, and a second bent glass panel having a front surface and a rear surface;*

*a sheet of polymeric interlayer disposed between the rear surface of said first panel and the front surface of said second panel wherein said polymeric interlayer laminates said first and second panel together, said lamination together of said first panel and said second panel being achieved by an autoclave process;*

*a mirror mounting button adhered to said rear surface of said second panel by a layer of substantially cured adhesive and an interior rearview mirror assembly supported by said button;*

*said layer of substantially cured adhesive being formed by disposing a film of a one-package, structural adhesive between said rear surface of said second second panel and said mirror mounting button, and curing said film in an autoclave process to form a joint between said button and said windshield, said curing of said film and said lamination of said windshield being achieved in the same autoclave process;*

*said film of structural adhesive comprising an epoxy resin and a dicyanodiamide latent hardener;*

*wherein said polymeric interlayer comprises plasticized polyvinylbutyral;*

*wherein said curing of said film occurs at a temperature greater than about 125° F. and less than about 325° F.;*

*wherein said mirror mounting button comprises one of a sintered steel mounting button or a die cast zinc mounting button;*

*wherein said adhesive in its cured state is one of gray or black; and*

*wherein said adhesive film comprises a polymeric epoxy reaction product.*

47. *The interior rearview mirror mounting system of claim 46, wherein said cured adhesive has a modulus of elasticity greater than about 30,000 psi at 25 degrees C. and wherein said film is die cut to a shape of said mirror mounting button.*

48. *The interior rearview mirror mounting system of claim 47, wherein said joint of said mirror button withstands at least 25,000 cycles of sinusoidal loading in tension/compression modes of +/−150 pounds at 10Hz with the testing performed at 25° C. and after preconditioning said joint for 360 hours in 98 to 100 percent relative humidity at 37° C. and with a 600 gram deadweight attached to said mirror button.*

* * * * *